March 17, 1953 A. M. ZALKIND 2,631,386
TOY CLOCK
Filed Sept. 19, 1949 2 SHEETS—SHEET 1
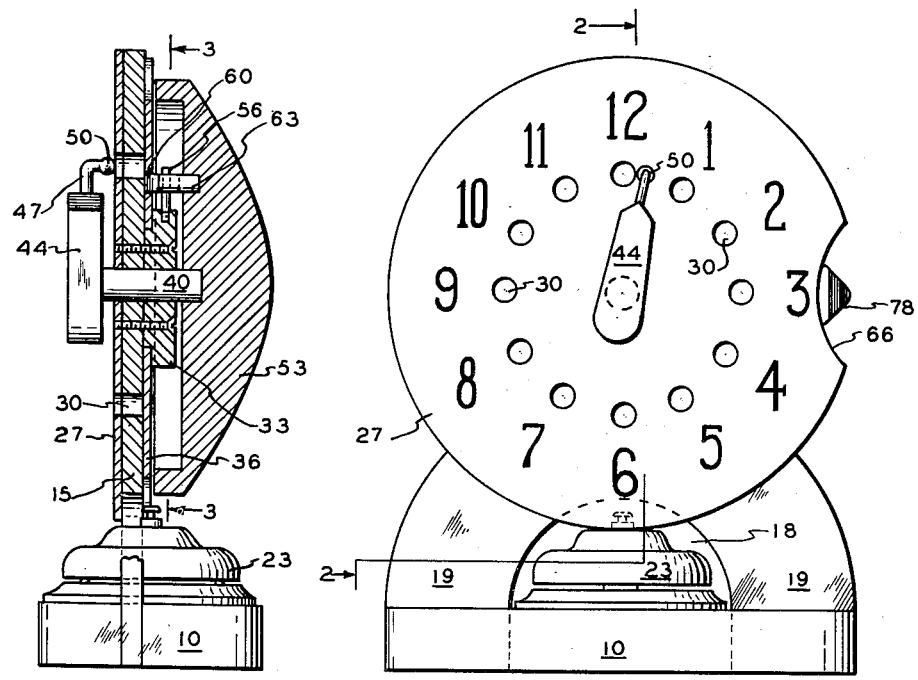
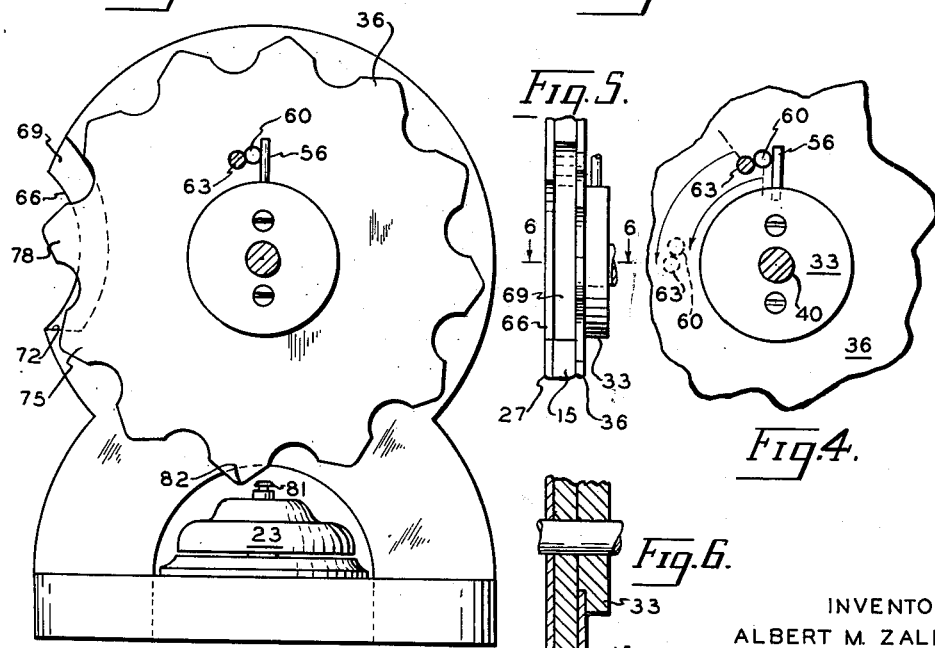
INVENTOR.
ALBERT M. ZALKIND
BY *Albert M Zalkind*

March 17, 1953  A. M. ZALKIND  2,631,386
TOY CLOCK
Filed Sept. 19, 1949  2 SHEETS—SHEET 2
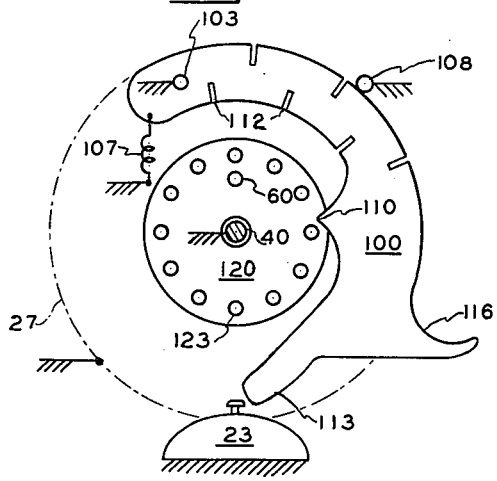
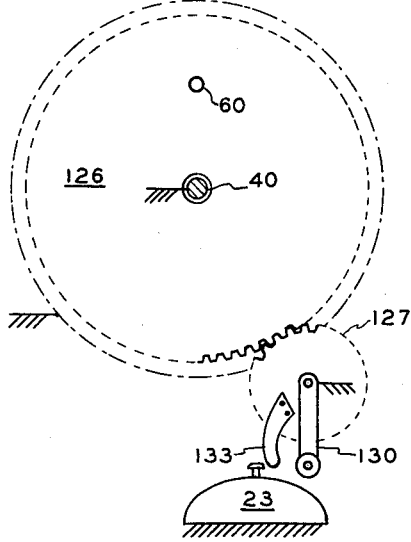
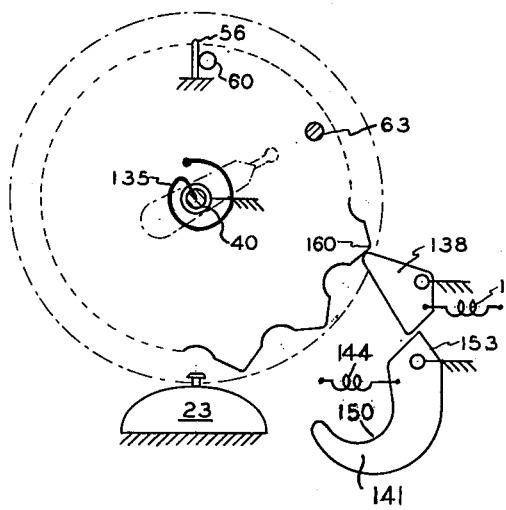
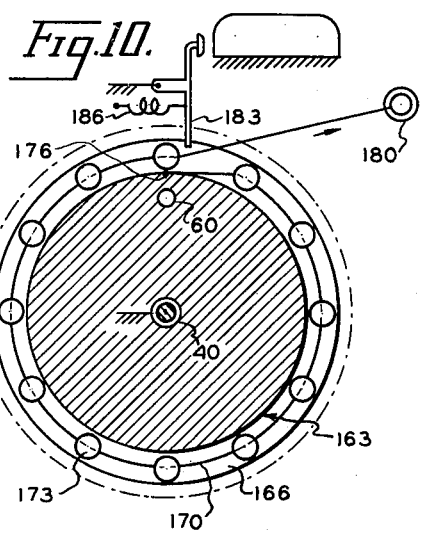
INVENTOR.
ALBERT M. ZALKIND
BY *Albert M. Zalkind*

Patented Mar. 17, 1953

2,631,386

UNITED STATES PATENT OFFICE 2,631,386

TOY CLOCK

Albert M. Zalkind, Arlington, Va.

Application September 19, 1949, Serial No. 116,470

14 Claims. (Cl. 35—39)

1

This invention pertains to toy clocks and more particularly to a clock capable of striking a bell a number of times corresponding to a predetermined setting of the hour hand.

An object of my invention is to provide a simple and rugged mechanism for a toy clock such that a child can easily manipulate it and by counting the number of times a bell is struck learn to recognize the numerals corresponding to the hours as well as to grasp the rudiments of telling time.

It is a further object of my invention to provide a toy clock having a high degree of amusement or play value, as well as educational value.

Other objects and features of my invention will be apparent from the description to follow.

In general my invention comprises a structure resembling a clock and incorporating a conventional call bell struck successively by the points of a star wheel, which wheel is manually rotatable a point at a time; there being twelve points corresponding to the hours of the clock. A suitable mechanism is provided whereby the extent of actuation of the star wheel is determined by manual setting of the hour hand of the clock, thus after the bell has been struck a number of times corresponding to a selected hour hand position, it is no longer possible to rotate the star wheel. Since it is well known that children of pre-school age can count, but do not recognize numbers, a child operating the clock will count the strikes and thus associate the count with the numeral to which he has set the hour hand. By repeated operations the child will readily learn to recognize the numbers, thus teaching himself the rudiments of telling time as well as acquiring numeral recognition.

A detailed description of my invention now follows with reference to the appended drawings in which:

Figure 1 shows a full front view of the clock,

Figure 2 shows a section through 2—2 of Figure 1,

Figure 3 is a rear view taken generally through 3—3 of Figure 2 but omitting non-essential structure.

Figure 4 is a fragmentary rear view showing the motion of certain elements of the mechanism for determining the extent of rotation of the star wheel, Figure 5 is a fragmentary side view showing the relationship of the clock face, support plate and star wheel, Figure 6 is a section through 6—6 of Figure 5, and

2

Figures 7-10 show modified mechanisms.

With reference to the figures of the drawing, my invention comprises a base 10 on which is mounted a plate 15, the plate being provided with a cut away area 18 such that legs 19 straddle a conventional call bell 23 and fit tightly into slots in the base on either side thereof. Mounted fixedly on plate 15 is a clockface 27 having the usual numerals thereon, each numeral having a respective hole 30 associated therewith. If desired, a minute hand (not shown) may be painted on the face pointing permanently to 12 o'clock.

A retaining collar 33 is secured at the rear of the plate 15 and rotatively mounted thereon is a star wheel 36. A shaft 40 passes through the aligned centers of elements 27, 15 and 33, being rotative and reciprocal in the bore therethrough. At the outer end of shaft 40 is fixedly secured an hour hand 44 which carries a locking element, 47, there being a bulbously shaped formation 50 at the end thereof. The inner end of shaft 40 terminates in a housing member 53 fixedly secured thereto. While not essential, the housing member may comprise a fairly massive structure as shown to steady the rotative "feel" of the hour hand and to assist in maintaining it at any desired hour by counteracting jiggling of the base or looseness of the shaft. Since the shaft is rotative and reciprocal it is obvious that the locking tip 50 may be inserted or withdrawn from any hole 30 by manipulation of the hour hand 44.

Secured in collar 33 is a stud 56, which is thus fixed with respect to the clockface at 12 o'clock, although it will subsequently be obvious that it may be secured at any other point, due regard being had for the positioning of a co-acting stud 60 carried by the star wheel and a stud 63 secured to the housing 53 and thus rotative with the hour hand.

Face 27 has an arcuate cut 66 therein thus partially exposing the points of wheel 36, while plate 15 has an extended cut 69 therein to permit ready access for a finger to press on each wheel point in turn, thus revolving the wheel in a series of 30° steps. Cut 69 terminates in a suitable shoulder 72 to limit the extent the wheel may be rotated in a single finger motion, the operator's finger engaging the shelf at the end of each stroke, and then moving upward to press down on the next point. Thus, as shown in Figure 3, point 75 is substantially in position to strike the bell and point 78 is now in position to be depressed. Each of the twelve points are devised to strike the pin 81 of bell 23 as the wheel is revolved, thus the bell rings each time a point at the position shown for 78 is depressed.

In operation, the hour hand is pulled outwardly to disengage the locking tip 50 from any hole 30 in which it may be, and then turned counter-clockwise whence stud 63 thereon engages stud 60 on the star wheel and forces the star wheel to rotate backwards to a starting position for telling time. The starting position is reached when stud 60 engages fixed stud 56, as shown in Figures 3 and 4, at which time the hour hand cannot be rotated further backwards, and is in a position substantially as shown in Figure 1, between 12 and 1 o'clock. If desired, point 78 may be tipped in a distinctive color as indicated in Figure 1 to visually signal the end of the "winding up" step, as it may be termed. The hour hand is then rotated clockwise to any desired hour, and thrust towards the face of the clock to engage tip 50 in the hole corresponding thereto, whereby it is locked in position.

If now the star wheel be rotated point after point as heretofore described, each motion of a point appearing at cut 66 will result in the lowermost point 63 striking the bell pin to ring the bell.

By referring to Figure 4, it will be apparent that stud 63 has been set (and locked) in 3 o'clock position; accordingly it will be possible to depress three points on the star wheel before 60 thereon engages stud 63, at which time further rotation of the wheel in a clockwise direction as viewed from the front is not possible. Thus three rings have sounded which are counted by the operator as they occur. The hour hand is now pulled to disengage the locking tip, rotating backwards to limiting position and the process repeated for the same or any other hour.

If desired the left side of the clockface may be provided with cuts such as 66 and 69 for returning the star wheel and ringing the bell at the same time.

As a structural matter, the thickness of the studs prevents the hour hand from returning to full 12 o'clock position when "winding up"; but obviously it is angularly related to stud 63 so that it aligns accurately with 12 o'clock when rotated clockwise. I have found the misalignment on "winding up" to be of no importance, although it could be eliminated by providing a rocking pivot mounting for stud 56 and limiting studs on each side thereof, if desired, as will be apparent from Figure 3.

From the foregoing it will be clear that a child operating the clock will control the rate at which the bell rings, whence the speed with which he must count the rings is self-regulated. This is a very important feature of my invention, and may be achieved by other mechanisms as hereinafter disclosed, although I believe the form shown in Figures 1–6 to be the most rugged and hence the most commercially feasible.

The modified mechanisms shown schematically in Figures 7–10 will all be understood to operate in conjunction with the elements heretofore described, such as the hour hand, studs 56, 60, 63, shaft 40, etc. and wherever possible these elements have been indicated with the same reference characters.

In Figure 7 is schematically disclosed a mechanism comprising an actuating lever 100 pivoted at 103 and biased counter-clockwise by spring 107 against a limit stud 108. The lever 100 is formed with a pawl 110, saw kerfs 112, a bell engaging abutment 113, and a finger accommodating extension 116. It is assumed that the view is taken forwardly, clock face 27 being represented in phantom. A disc 120 is rotatively mounted on shaft 40 and carries twelve pegs 123 spaced 30° apart as well as stud 60 as heretofore described. In operation when the lever is pressed at 116, the bell is struck and disc 120 rotated by point 110 a suitable distance before the upper pegs are struck by the lever 100, thus stopping further motion of lever 100 which is then released by the operator and resumes its initial position. Obviously, on the return movement pawl 110 may kick the peg at 3 o'clock counter-clockwise slightly but the dimensions of the parts are such that the slight backward motion is of no import, saw kerfs 112 making the lever sufficiently resilient to flex when passing the peg counter-clockwise. It is, of course, understood that disc 120 will have sufficient frictional resistance to prevent any backward rotation due to momentum when it is kicked by the point in either direction, and to flex the lever so as to insure engagement with that peg on the downward stroke. Thus the lever 100 is actuated until stud 60 strikes stud 63 (not shown) all as heretofore described.

Figure 8 discloses an arrangement for actuating stud 60 comprising a gear 126 on which it is mounted, the gear being rotated by a pinion 127, the ratio being 12:1. The pinion is fixed to a crank 130 which is manually turned, and a striker arm 133 is carried by the pinion. Thus each time the crank revolves 360°, the bell is struck and the gear 126 is rotated 30° to the end of its travel as determined by the setting of the hour hand.

Figure 9 discloses star wheel 36 as heretofore described carrying stud 60; a spiral spring 135 being arranged between wheel 36 and shaft 40. The spring is partially wound up during assembly, stud 56 preventing it from completely unwinding although the hour hand is always biased counter-clockwise, thus as the hour hand is rotated clockwise the spring 135 is further tensioned. Wheel 36 may be held in non-rotative condition by a conventional manual trip system or by a system comprising pawl 138 and finger release member 141. Spring 144 biasing the latter is stronger than spring 147 biasing the former. Thus applying finger pressure to recess 150 rotates point 153 to trip the pawl 138 out of engagement with wheel point 160, whence the wheel is rotated clockwise by spring 135. The spring 147 returns the pawl 138 in time to engage the next wheel point, and finally release of member 141 from finger pressure permits spring 144 to return it to starting position, kicking pawl 138 clockwise during this motion and not releasing the engaged wheel point.

Figure 10 discloses a mechanism wherein stud 60 is carried by a disc 163 shown in section so as to reveal a groove 166 in which is housed a string or cable 170 on which are fixedly and spacedly secured twelve beads 173. One end of the string is fastened at 12 o'clock to the bottom of the groove at 176, the other end extending outwardly and terminating in a handle or ring 180. A bell striking lever 183 biased by a spring 186 is positioned so that pulling ring 180 causes successive beads to trip the lever 183 thus striking the bell as each bead is pulled past the lower end of the lever. Disc 163 will obviously be rotated 30° each time a bead is pulled outwardly of the groove in the direction indicated by the arrow, until stud 60 engages the hour hand stud (not shown) all as previously described.

If desired the beads may be inscribed with numbers from one to twelve, whence a child not only counts the chimes but counts the beads drawn from the groove and also compares the number of the last bead drawn with the number of the hour to which the hour hand is set.

I am aware that my disclosure is subject to much variation without departing from the teaching thereof and accordingly I do not seek to be limited to the specific illustrations except as set forth in the appended claims.

I claim:

1. A toy clock comprising a signal means, a signal actuating means, and means for limiting the extent of actuation of said signal actuating means, said limiting means comprising a clockface having numerals thereon and a hole therethrough for each numeral, including an hour hand rotatable with respect to said numerals and means for lockingly engaging said hour hand with a selected hole corresponding to a number on said clock face.

2. A toy clock comprising a signal means, a signal actuating means for emitting individual signals, a clock face having numerals thereon, a manually-rotative hour hand associated with said clock face and limit means operable by rotation of said hour hand for limiting the extent of actuation of said signal actuating means to predetermine the number of signals emitted according to the setting of said hand, wherein said limit means comprises an abutment movable to a predetermined position by rotation of said hour hand, including an abutment movable in response to actuation of said signal actuating means, said abutments being engageable to limit actuation of said actuating means at a predetermined point.

3. A toy clock as set forth in claim 2, and additional abutment means engageable with either of said abutments, and positioned so as to determine the starting positions of said abutments.

4. A toy clock as set forth in claim 3, including means for locking said hour hand in a selected position.

5. A toy clock comprising a signal means, a signal actuating means for emitting individual signals, a clock face having numerals thereon, a manually-rotative hour hand associated with said clock face and limit means operable by rotation of said hour hand for limiting the extent of actuation of said signal actuating means to predetermine the number of signals emitted according to the setting of said hand, wherein said actuating means comprises a star wheel manually rotatable for triggering said signal means, including an abutment means carried by said star wheel and rotative therewith, said limit means comprising an abutment means engageable with said first abutment means, and an additional abutment means engageable by either of said first two abutment means for determining the extent of rotation thereof in either direction.

6. A toy clock comprising a clockface, a manually rotatable hour hand, a manually rotatable star wheel mounted concentrically with said hour hand and rearwardly of said face, a signal means and means for supporting said signal means so as to be triggered successively by the points of said star wheel, a first stud integrally secured to said hour hand at the rear of said clock face, a second stud carried by said star wheel, said studs being engageable at a point predetermined by the setting of said hour hand to signify the limit of motion of said star wheel.

7. A toy clock comprising a clockface, a rotative hour hand, a bell, a bell sounding means, including means settable with rotation of said hour hand to indicate a selected hour and having a normally stationary limit element disposable in a position corresponding to said selected hour, a manually operable means disposed for successively actuating said bell sounding means and simultaneously moving a second limit element a predetermined increment for each ring, said limit elements being thus engageable, whereby, when said limit elements engage, said manually operable means is rendered ineffective for actuating said bell sounding means.

8. A toy clock as set forth in claim 7 wherein said manually operable means comprises a star wheel having points thereon accessible for successive movements of said wheel, said second limit element being carried by said wheel.

9. A toy clock as set forth in claim 7, wherein said manually operable means comprises a pawl and ratchet mechanism, said second limit means being carried by said ratchet, and said pawl being accessible for successive movements by an operator's finger.

10. A toy clock as set forth in claim 7, wherein said manually operable means comprises a string and a wheel, including a plurality of spaced protuberances on said string, and said string having a free end accessible for application of manual tension thereon, said second limit means being carried by said wheel, and said bell sounding means being successively engageable by said protuberances as said string is pulled to effect ringing of said bell, wherein said wheel is simultaneously rotated to effect engagement of said limit means.

11. A toy clock as set forth in claim 7, wherein said manually operable means comprises a gear, said second limit means being carried thereby, and a manually rotatable pinion engaging said gear, said bell sounding means being actuated by said pinion upon rotation thereof.

12. A toy clock as set forth in claim 7, wherein said bell sounding means comprises a resilient element and a bell clapper biased thereby so as to be trippable for striking said bell and wherein said manually operable means includes an element for tripping said clapper successively.

13. A toy clock as set forth in claim 6, including a third stud carried rearwardly of said clock face and being substantially fixed, the stud on said star wheel being disposed intermediate said third stud and the stud secured to said hour hand, said studs being relatively rotative in the same circle so as to be engageable with each other, said hour hand being operative to drive said star wheel in a counterclockwise direction, when manually rotated, by virtue of engagement of the respective studs thereon, the limit of rotation being determined by the disposition of said third stud, and the stud on said hour hand being operative to limit the extent of rotation of said star wheel in a clockwise direction by engaging the stud thereof.

14. A toy clock comprising a signal means, a signal actuating means for emitting individual signals, a clock face having numerals thereon, a manually rotative hour hand associated with said clock face, and limit means operable by rotation of said hour hand for limiting the extent of actuation of said signal actuating means to limit the number of signals emittable according to the setting of said hand, wherein said signal actuating means comprises a manually operable element whereby the time elapse between signals emitted is at the will of an operator.

ALBERT M. ZALKIND.

REFERENCES CITED

The following references are of record in the file of this patent:

UNITED STATES PATENTS

| Number | Name | Date |
|---|---|---|
| 259,171 | Kirkpatrick | June 6, 1882 |
| 454,556 | Cooley | June 23, 1891 |
| 618,099 | Howland | Jan. 24, 1899 |
| 623,558 | Paterson | Apr. 25, 1899 |
| 831,068 | Helms | Sept. 18, 1906 |
| 1,036,381 | Togna | Aug. 20, 1912 |
| 1,441,389 | Vincent | Jan. 9, 1923 |
| 1,537,390 | Vincent | May 12, 1925 |

FOREIGN PATENTS

| Number | Country | Date |
|---|---|---|
| 607,272 | Great Britain | Aug. 27, 1948 |